Figure 1:
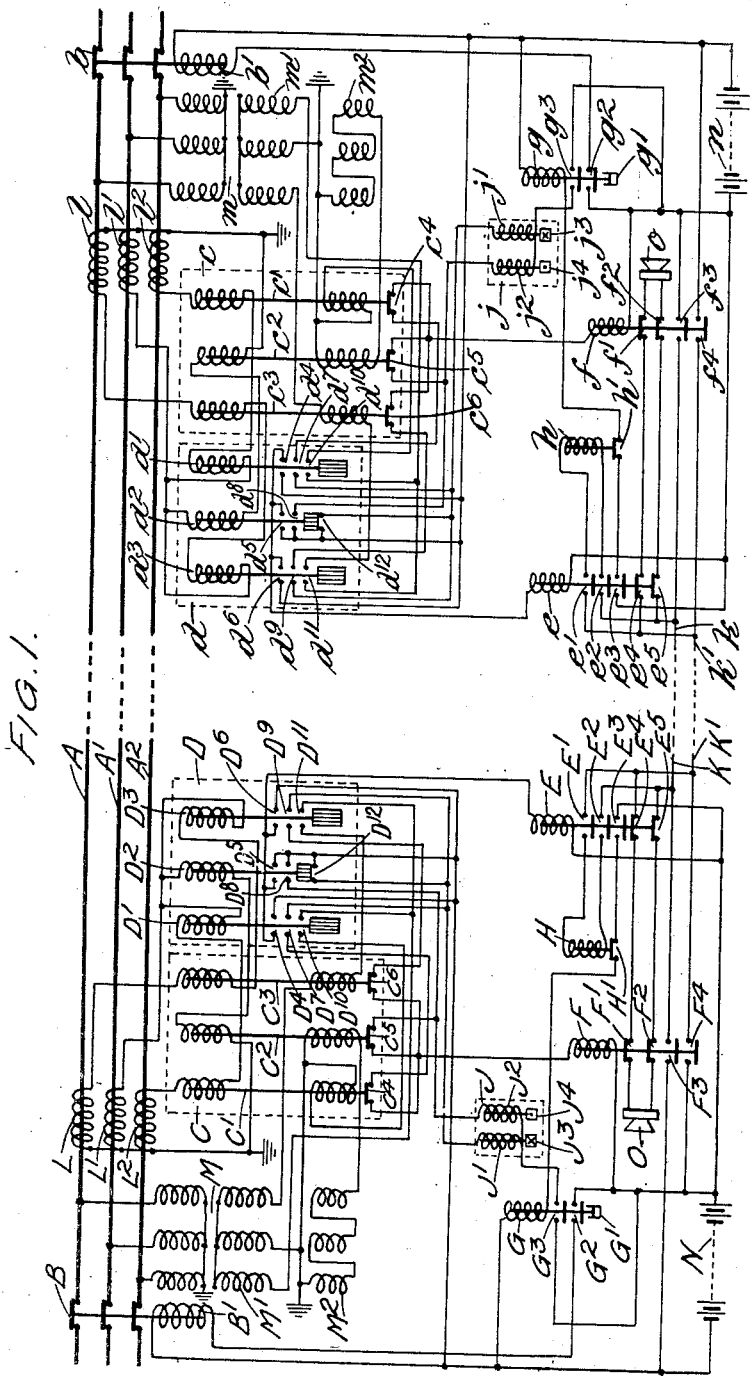

Oct. 26, 1937.   H. LEYBURN   2,097,213
PROTECTIVE ARRANGEMENT FOR SECTIONALIZED ELECTRIC POWER CIRCUITS
Filed Sept. 28, 1934   2 Sheets-Sheet 1

Inventor,
H. Leyburn,
Per,
Watson, Coit, Morse & Grindle
Atty

Oct. 26, 1937. H. LEYBURN 2,097,213
PROTECTIVE ARRANGEMENT FOR SECTIONALIZED ELECTRIC POWER CIRCUITS
Filed Sept. 28, 1934 2 Sheets-Sheet 2

Inventor,
H. Leyburn.
Per,
Watson, Coit, Inne & Guindie
Atty.

Patented Oct. 26, 1937

2,097,213

UNITED STATES PATENT OFFICE 2,097,213

PROTECTIVE ARRANGEMENT FOR SECTIONALIZED ELECTRIC POWER CIRCUITS

Henry Leyburn, Newcastle-upon-Tyne, England, assignor to A. Reyrolle & Company Limited, Hebburn-on-Tyne, England, a company of Great Britain Application September 28, 1934, Serial No. 745,986
In Great Britain October 12, 1933

20 Claims. (Cl. 175—294)

This invention relates to protective arrangements for sectionalized electric power circuits of the kind in which each section is protected independently of the other sections and in which a tripping relay device at one end acts to trip the adjacent circuit-breaker unless prevented by a stabilizing current which is transmitted from the other end when the power current is flowing out of the section at such other end.

One arrangement of this kind is described in the specification of United States of America Patent No. 1,765,887, and this arrangement comprises a tripping relay device at each end, a stabilizing relay device at each end operative on the occurrence of a fault in the system only when the power current is flowing out from the section at the end adjacent to such device, and means whereby the operation of the stabilizing relay device causes the transmission of the stabilizing current to the other end. Thus each tripping relay device when it operates, causes the energization of a time-lag relay controlling tripping circuits, the time lag of the relay being such as to allow a sufficient time for a lock-out relay at the same end to be energized to prevent tripping, by the stabilizing current which is transmitted from the remote end if the stabilizing relay device at that end is operated by power current flowing out of the section.

In another arrangement of this kind, described in the specification of United States of America Patent No. 1,919,092, a tripping relay device at each end initiates the transmission of a tripping current signal to the remote end and the tripping of the circuit-breaker at each end is controlled jointly by the operation of the adjacent tripping relay device and the reception of the tripping current signal from the remote end. Stabilization in the event of a straight-through fault current due to a fault outside the section, is effected by a stabilizing relay device at each end which operates when power is flowing out from the section at such end, to cause the transmission of a stabilizing current signal to the remote end to prevent tripping of the circuit-breaker.

In the improved arrangement of this kind according to the present invention, a stabilizing current is transmitted from one end of the section on the operation of the tripping relay device at that end unless such transmission is prevented by the opening of normally closed contacts of a stabilizing relay device responsive to the direction of power current flow at the adjacent end. Thus the transmission of the stabilizing current may be controlled by normally open contacts of the tripping relay device and by the normally closed contacts of the stabilizing relay device so that the stabilizing current is transmitted when the tripping relay device is operated by a fault current flowing out from the protected section at the adjacent end, but such transmission is prevented when both the stabilizing relay device and the tripping relay device are operated by a fault current flowing into the protected section at the adjacent end.

Conveniently each tripping relay device comprises one or more relays having two sets of contacts and means whereby a lower current setting is obtained for operation of one set of contacts than for operation of the other set of contacts. The low-current-setting contacts of each tripping relay device are then connected in series with the normally closed contacts of the adjacent stabilizing relay device to control the transmission of the stabilizing current, whilst the high-current-setting contacts control the trip circuit of the adjacent circuit-breaker. If desired, one or more of the relays of each tripping relay device may be provided with additional normally open low-current-setting contacts which are connected in series with the energizing circuit of the adjacent stabilizing relay device so that this device can only operate when the relay or relays of the tripping relay device have closed their low-current-setting contacts.

The stabilizing current may be transmitted between the ends by pilot wires or by high frequency current signals superimposed on the power conductors of the protected section. When pilot wires are employed, these are preferably normally used for telephonic or other purposes and are "borrowed" by means of transfer contacts on the tripping and stabilizing relay devices or on auxiliary relays controlled thereby, when a fault current of sufficient magnitude to cause the operation of such devices flows in the protected section.

The following is a description, by way of example, of two practical arrangements according to this invention, as applied to the protection of a three-phase power transmission line forming part, for example, of a ring main, with reference to the acompanying drawings, in which—

Figure 2:
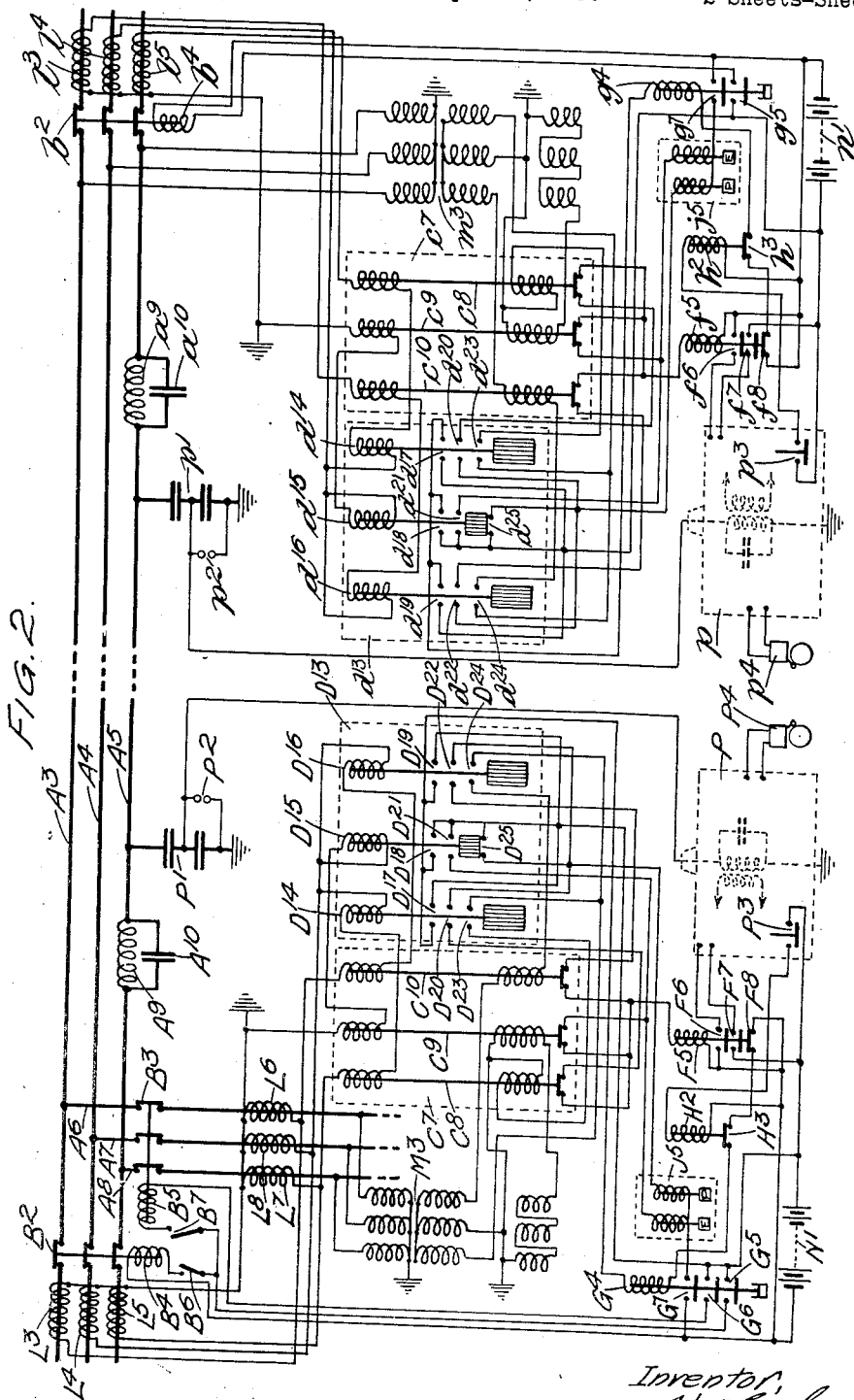

Figure 1 is a wiring diagram of one arrangement employing pilot wires between the ends of the protected section, and Figure 2 is a wiring diagram of the other arrangement in which signals are transmitted between the ends of the section by high frequency current superimposed on the power conductors.

In both the arrangements to be described the protected section comprises a three-phase power transmission circuit having circuit-breakers at its ends and for convenience of description the apparatus at one end of the section, conveniently referred to as the "home" end is indicated in capital letters and the corresponding apparatus at the other end of the section, referred to as the "remote" end, in small reference letters.

In both arrangements the protective gear at each end of the section includes a directional stabilizing relay device which is operative when the overload and/or earth leakage current exceeds a predetermined value and when power is flowing into the section at the adjacent end and a tripping relay device which is non-directional in operation so that it operates when a fault current is flowing in the section at the adjacent end irrespective of its direction. The protective apparatus at one end is identical with that at the other end and in general it is proposed to describe in detail only the apparatus at the home end, it being assumed that there is similar apparatus at the remote end which can be identified from the figures by the use for corresponding apparatus of the same reference letters.

In the arrangement shown in Figure 1 the protected section, comprising power conductors A $A^1$ $A^2$, is provided at its ends with circuit-breakers B $b$ having trip coils $B^1$ $b^1$ respectively and with protective gear comprising directional stabilizing relay devices C $c$, non-directional tripping relay devices D $d$, groups of auxiliary relays E F G H and $e$ $f$ $g$ $h$ controlled by the stabilizing and tripping relay devices and respectively controlling the circuits of the trip coils $B^1$ $b^1$ and fault indicators J $j$. A pair of pilot wires K $K^1$ which are normally used for telephone purposes, extend between the ends of the section.

Considering now the protective apparatus at the home end in detail, the tripping relay device D consists of a group of three overload and earth leakage relays $D^1$ $D^2$ $D^3$ which are energized in the well known manner from current transformers L $L^1$ and $L^2$ in the conductors A $A^1$ $A^2$ so that either the relay $D^1$ or $D^3$ operates when there is a fault current flowing due to an interphase fault and the relay $D^2$ operates when the fault current is due to an earth fault. Each of the relays $D^1$ $D^2$ and $D^3$ has two sets of contacts operating at different current settings in the manner described in the specification of United States of America Patent No. 1,919,092 referred to above. Thus each relay may comprise an operating coil, a movable member electromagnetically controlled by the operating coil and two sets of contacts sequentially operated by movement of such member, the arrangement being such that after operation of the first set of contacts, the movable member engages a spring-loaded stop or other device for increasing the force on this member which opposes the force exerted by the operating coil. Two suitable constructions of relay are described in the specification of United States of America Patent No. 1,919,092.

In addition to the two sets of contacts referred to above each of the relays $D^1$ $D^3$ has a third set of contacts which are closed simultaneously with the low-current-setting contacts whilst the relay $D^2$ has a third set of contacts which are normally closed but which are open as soon as the relay operates to close its low-current-setting contacts. Thus the relays $D^1$ $D^2$ and $D^3$ have respectively high-current-setting contacts $D^4$ $D^5$ $D^6$ and low-current-setting contacts $D^7$ $D^8$ and $D^9$ whilst the relays $D^1$ and $D^3$ have additional low-current-setting contacts $D^{10}$ and $D^{11}$ which close simultaneously with the contacts $D^7$ or $D^9$ as the case may be and the relay $D^2$ has additional normally closed contacts $D^{12}$ which open when the relay operates to close its contacts $D^8$.

The stabilizing relay device C comprises a group of three directional overload and earth leakage relays $C^1$ $C^2$ $C^3$. Each of these relays has two coils, one coil being energized from the current transformers L $L^1$ $L^2$ and the other coil from a three-phase potential transformer M, the primary winding of which is energized from the power conductors A $A^1$ $A^2$. The potential transformer M is provided with a secondary winding $M^1$ and a tertiary winding $M^2$ and the current and potential coils of the relays $C^1$ $C^2$ $C^3$ are so connected to the current transformers and the potential transformers respectively that these relays only operate when fault current is flowing into the protected section, the relay $C^1$ or $C^3$ operating in the case of an interphase fault and the relay $C^2$ in the case of an earth fault. The potential coils of the relays $C^1$ and $C^3$ are respectively connected to the transformer M in series with the normally open low-current-setting contacts $D^{10}$ and $D^{11}$ of the corresponding relays $D^1$ and $D^3$ of the tripping relay device D in order to prevent the relay $C^1$ or $C^3$ from being operated inadvertently by a current flowing into the section which is insufficient to operate the corresponding relay $D^1$ or $D^3$. The relays $C^1$ $C^2$ $C^3$ are respectively provided with normally closed contacts $C^4$ $C^5$ $C^6$.

The auxiliary relays comprise an auxiliary tripping relay E, an auxiliary stabilizing relay F, a time-lag trip relay G and a lock-out relay H. The time-lag trip relay G is energized from a station battery N which supplies the energizing current for all the auxiliary relays, over a circuit including the normally closed contacts $H^1$ of the lock-out relay H and normally open contacts $E^3$ of the auxiliary tripping relay E. Thus on the operation of the auxiliary tripping relay E the time-lag relay G operates, after a predetermined time delay controlled by a dash pot or other device indicated at $G^1$, to complete, at its contacts $G^2$, the circuit of the circuit-breaker trip coil $B^1$ provided that, in the meantime, the lock-out relay H has not operated to open its normally closed contacts $H^1$. The auxiliary tripping relay E is energized from the battery N over a circuit including the high-current-setting contacts $D^4$ $D^5$ $D^6$ of the relays of the tripping relay device D connected in parallel with one another. When it operates, the relay E, in addition to closing the contacts $E^3$ in the circuit of the time-lag trip relay G, opens its normally closed contacts $E^4$ and $E^5$ to disconnect from the pilot wire circuit K $K^1$ a telephone O or other apparatus with which this circuit is normally associated, and closes its contacts $E^1$ $E^2$ for connecting the pilot wires K $K^1$ to the lock-out relay H.

The auxiliary stabilizing relay F is energized over one or other of a group of parallel circuits each of which includes one of the normally closed contacts $C^4$ $C^5$ $C^6$ of the relays $C^1$ $C^2$ $C^3$ of the stabilizing relay device C in series with the normally open low-current-setting contact $D^7$ or $D^8$ or $D^9$ of the corresponding relay $D^1$ or $D^2$ or $D^3$ of the tripping relay device D. The auxiliary stabilizing relay F is thus energized when a relay of the tripping relay device D operates to close its low-current-setting contacts provided that the corresponding relay of the stabilizing relay device C has not operated to open its normally closed contacts owing to the fact that the fault current is flowing into the section at the home end. The auxiliary stabilizing relay F operates to open its normally closed contacts $F^1$ $F^2$ to disconnect the telephone O from the pilot wire circuit and to close its contacts $F^3$ and $F^4$ to connect the battery N to this circuit so that a stabilizing current is transmitted over the pilot wires to the remote end.

The normally closed low-current-setting contacts $D^{12}$ of the relay $D^2$ of the tripping relay device D are connected in series with those energizing circuits for the auxiliary stabilizing relay F which are controlled by the low-current-setting contacts $D^7$ and $D^9$ of the relays $D^1$ and $D^3$ of the tripping relay device. The provision of these additional normally closed contacts is a safety measure which ensures that in the event of an interphase fault outside the section and an earth fault in the section occurring simultaneously the auxiliary stabilizing relay F is not operated to prevent the section being cut out.

As it is desirable to have some indication as to whether a fault which causes operation of the protective gear is an earth fault or an interphase fault, a fault indicator J is provided having two coils $J^1$ and $J^2$ which respectively operate phase-fault and earth-fault indicators $J^3$ and $J^4$. One side of the coil $J^1$ is connected to one side of the battery N over a circuit including the normally closed contacts $D^{12}$ of the relay $D^2$, whilst one side of the coil $J^2$ is connected to one side of the battery over a circuit including the low-current-setting contacts $D^8$ of the relay $D^2$. The other sides of the coils $J^1$ and $J^2$ are connected together and to the other side of the battery in series with a normally open contact $G^3$ of the time-lag trip relay G.

In the event of an internal fault in the section when the section is connected to the source of power at both ends, the fault current will flow into the section from both ends and the appropriate relay of the home and remote tripping relay device D $d$ will consequently operate to close both sets of contacts. As soon as the relays, say $D^1$ $d^1$, of the tripping relay devices close their low-current-setting contacts $D^7$ $D^{10}$ $d^7$ $d^{10}$, the corresponding relays $C^1$ $c^1$ of the stabilizing relay devices C $c$ at both ends will also operate. The operation of the stabilizing relay $C^1$ opens the normally closed contacts $C^4$ in the circuit of the auxiliary stabilizing relay F so that this relay remains inoperative and no stabilizing current is transmitted to the remote end. The operation of the relay $D^1$ to close its high-current-setting contacts $D^4$ completes the circuit of the auxiliary tripping relay E which operates to connect the lock-out relay H to the pilot wires K $K^1$ at its contacts $E^1$ $E^2$, $E^4$ $E^5$ and at its contacts $E^3$ to complete the circuit of the time-lag trip relay G.

At the remote end the operation of the relay $c^1$ of the stabilizing relay device $c$, following the operation of the relay $d^1$ to close its low-current-setting contacts $d^7$ and $d^{10}$, prevents the energization of the auxiliary stabilizing relay $f$. The operation of the relay $d^1$ to close its high-current-setting contacts $d^4$ completes the circuit of the auxiliary tripping relay $e$ which operates to connect the lock-out relay $h$ to the pilot wires K $K^1$ and to complete the circuit of the time-lag trip relay $g$. The connection of the lock-out relays H $h$ to the pilot wires K $K^1$ is ineffective since both the home and the remote auxiliary stabilizing relays remain inoperative and there is no battery connected to this circuit. After a short time delay, the time-lag relays G $g$ at both ends operate to cause tripping of the circuit-breakers and thus the isolation of the faulty section.

The operation of the time-lag trip relays G $g$ also completes at the contacts $G^3$ $g^3$ the circuits of one of the coils of the fault indicator at each end. Thus at the home end when tripping is effected due to the operation of either the relay $D^1$ or the relay $D^3$, the operation of the time-lag tripping relay G completes at its contacts $G^3$ the circuit of the coil $J^1$ of the phase fault indicator $J^3$ whilst when tripping is caused by the operation of the relay $D^2$ the closing of the contact $G^3$ completes the circuit of the coil $J^2$ of the earth fault indicator $J^4$. A corresponding indication of the nature of the fault is given at the remote end by the actuation of the indicator $j^3$ or $j^4$ as soon as the time-lag relay $g$ operates.

In the event of an external fault causing a heavy straight-through current to flow in the protected section, say from the home end to the remote end, the appropriate relay, say the relay $D^1$, of the tripping relay device D operates to close both its low- and high-current-setting contacts and the corresponding relay $C^1$ of the stabilizing relay device C operates to open its normally closed contacts. The auxiliary stabilizing relay F thus remains inoperative whilst the operation of the relay $D^1$ to close its high-current-setting contacts $D^4$ completes the circuit of the auxiliary tripping relay E which operates to complete, at its contacts $E^3$, the circuit of the time-lag trip relay G and at its contacts $E^4$ $E^5$ and $E^1$ $E^2$, to disconnect the telephone O from the pilot wire circuit K $K^1$ and to connect the lock-out relay H to this circuit. At the remote end the relay $d^1$ of the tripping relay device $d$ operates to close its low- and high-current-setting contacts $d^4$ $d^7$ $d^{10}$ but, as the fault current is flowing out from the section at this end, the relay $c^1$ of the stabilizing relay device $c$ is not operated. As soon as the relay $d^1$ closes its low-current-setting contacts $d^7$ $d^{10}$, the auxiliary stabilizing relay $f$ operates to disconnect the pilot wires K $K^1$ from the telephone $o$ and to connect the battery $n$ to this circuit. The operation of the relay $d^1$ to close its high-current-setting contacts $d^4$ completes the circuit of the auxiliary tripping relay $e$ which operates to connect the lock-out relay $h$ to the pilot wires K $K^1$ and to complete the circuit of the time-lag trip relay $g$. The connection of the battery $n$ to the pilot wire circuit causes a current to be transmitted over this circuit from the remote to the home end, this current energizing both the lock-out relays H $h$ so that these relays open their normally closed contacts $H^1$ $h^1$ respectively, thereby opening the circuits of the time-lag trip relays G $g$ and preventing tripping of the circuit-breakers at both ends.

In the case of an internal fault fed from one end of the section only, say, from the home end, the appropriate relays of the home tripping and stabilizing relay devices D and C both operate so that, after a short time interval, the time-lag trip relay G operates in the manner described above to cause tripping of the circuit-breaker B.

In the arrangement shown in Figure 2 the protected section comprises power conductors $A^3$ $A^4$ $A^5$ forming part of a ring main and provided at the home end with a T-connection comprising the conductors $A^6$ $A^7$ and $A^8$. The circuit-breakers $B^2$ and $B^3$ in the ring main and the T-connection respectively are provided in order to isolate the protected section at the home end whilst the circuit-breaker $b^2$ is provided at the remote end to isolate the protected section from the adjoining section of the ring main. The circuit-breakers $B^2$ $B^3$ and $b^2$ are respectively provided with trip coils $B^4$ $B^5$ and $b^4$.

This arrangement differs from the arrangement shown in Figure 1 mainly in that the stabilizing current is transmitted between the ends of a section by means of high frequency signals superimposed on the power conductors. Thus at the home end a transmitter and a receiver of high frequency current are provided, this high frequency apparatus being indicated diagrammatically at P. The high frequency transmitter and receiver are coupled to the power conductor $A^5$ by means of a tapping on a coupling condenser $P^1$ connected between this conductor and earth and in order to protect the high frequency apparatus from excess voltages, a spark gap $P^2$ is connected between the tapping point on the condenser $P^1$ and earth. A tuned choking device comprising a choke coil $A^9$ having connected across it a condenser $A^{10}$ is arranged in the power conductor $A^5$ to prevent the superimposed high frequency currents entering the adjoining sections. A corresponding transmitter and a receiver $p$ are provided at the remote end and are coupled to the power conductor $A^5$ at that end. Preferably the transmitters and receivers are tuned to the same frequency but if desired the transmitters at the two ends may be arranged to transmit at different frequencies in which case each receiver is tuned to the frequency of the transmitter at the remote end.

Tripping and stabilizing relay devices and a group of auxiliary relays are provided at each end and are arranged in a manner generally similar to the corresponding relays in the arrangement shown in Figure 1, so as to control the tripping of the circuit-breaker or circuit-breakers at the adjacent end and the transmission of a stabilizing current signal to the remote end.

The apparatus at the home end comprises, in addition to the high frequency apparatus, a directional stabilizing relay device $C^7$ having three two-coil relays $C^8$ $C^9$ and $C^{10}$ and a non-directional tripping relay device $D^{13}$ having three two-current setting relays $D^{14}$ $D^{15}$ and $D^{16}$.

The current coils of the stabilizing relays $C^8$ $C^9$ and $C^{10}$ and the coils of the tripping relays $D^{14}$, $D^{15}$ and $D^{16}$ are energized from two sets of current transformers $L^3$ $L^4$ $L^5$ and $L^6$ $L^7$ $L^8$ respectively disposed on the conductors of the ring main and the T-connection on the sides of the circuit-breakers $B^2$ and $B^3$ which are remote from the conductors $A^3$ $A^4$ $A^5$. The current transformers are so connected together and to the coils of the relays that in the case of the tripping relay device, the relay $D^{14}$ or $D^{15}$ operates when the fault current is due to an interphase fault and the relay $D^{15}$ operates when it is due to an earth fault whilst in the case of the stabilizing relay device the relay $C^8$ or $C^{10}$ operates in the case of a phase fault current and the relay $C^9$ in the case of an earth fault current provided, of course, that power is flowing into the protected section. The potential coils of the relays $C^8$ $C^9$ $C^{10}$ are connected to a potential transformer $M^3$ as in the arrangement shown in Figure 1, in such a way as to provide the discriminative and directional properties specified above.

In this arrangement, an auxiliary tripping relay is not required and the high-current-setting contacts $D^{17}$ $D^{18}$ $D^{19}$ of the relays $D^{14}$ $D^{15}$ and $D^{16}$ of the tripping relay device $D^{13}$ are connected in parallel with one another and in series in the circuit of the time-lag trip relay $G^4$. As in the pilot wire arrangement, the circuit of the time-lag relay $G^4$ also includes the normally closed contacts $H^3$ of a lock-out relay $H^2$ which is controlled by the adjacent high frequency receiver, as is indicated diagrammatically by the normally open contact $P^3$, so that the lock-out relay $H^2$ operates to open its contact $H^3$ and thus to prevent tripping of the circuit-breakers $B^2$ and $B^3$ when the receiver is energized by a high frequency stabilizing current signal received from the transmitter at the remote end.

An auxiliary stabilizing relay $F^5$ is energized as in the pilot wire arrangement, over one or other of a group of parallel circuits each of which includes the normally closed contacts of one of the relays $C^8$ $C^9$ $C^{10}$ of the stabilizing relay device $C^7$ in series with the normally open low-current-setting contacts $D^{20}$, $D^{21}$ or $D^{22}$ of the corresponding relay of the tripping relay device $D^{13}$, the normally closed low-current-setting contact $D^{25}$ of the relay $D^{15}$ being also included in series in the two circuits which respectively include the contacts $D^{20}$ and $D^{22}$. The auxiliary stabilizing relay $F^5$ is provided with two normally open contacts $F^6$ and $F^7$ which, when this relay operates, connect the station battery $N^1$ to the high frequency apparatus P, thereby initiating the operation of the transmitter to send a high frequency stabilizing current signal to the remote end. The auxiliary stabilizing relay $F^5$ is also provided with normally closed contacts $F^8$ connected in series in the circuit of the time-lag trip relay $G^4$ so as to prevent operation of this relay and tripping of the circuit-breakers $B^2$ and $B^3$ when power is flowing out from the section at the adjacent end.

In the event of a straight-through fault current when, say, the direction of power current flow is from the home to the remote end, the appropriate relays, say, the relays $D^{14}$ and $C^8$, of the tripping and stabilizing relay devices $D^{13}$ and $C^7$ and the relay $d^{14}$ of the tripping relay device $d^{13}$ will operate. At the home end the opening of the normally closed contacts of the relay $C^8$ prevents the operation of the auxiliary stabilizing relay $F^5$ whilst the closing of the high-current-setting contacts $D^{17}$ of the relay $D^{14}$ initiates the operation of the time-lag trip relay $G^4$. At the remote end the closing of the low-current-setting contacts $d^{20}$ $d^{23}$ cause, since the contacts of the stabilizing relay $c^8$ remain closed, the energization of the auxiliary stabilizing relay $f^5$ whilst the closing of the high-current-setting contacts $d^{17}$ initiates the operation of the time-lag trip relay $g^4$. The auxiliary stabilizing relay $f^5$ operates its contacts $f^6$ $f^7$ to initiate the transmission of a high frequency stabilizing current signal to the home end and at its contact $f^8$ to open the circuit of the time-lag relay $g^4$ thereby preventing the tripping of the circuit-breaker $b^2$ at the remote end. The receiver at the home end is energized by the incoming high frequency stabilizing current signal and operates the contact $P^3$ to complete the circuit of the lock-out relay $H^2$ which opens its normally closed contact $H^3$ thereby preventing operation of the trip relay $G^4$ and tripping of the circuit-breakers $B^2$ and $B^3$.

The operation of this arrangement in the event of other types of fault will be clear from the above description and from the description of the operation of the pilot wire arrangement.

It will be noted that the time-lag trip relay $G^4$ has two contacts $G^5$ and $G^6$ which respectively control the trip coils $B^4$ and $B^5$, the trip coil circuits being respectively provided with manually operable switches B⁶ and B⁷ so that the operation of the relay G⁴ may be arranged to control the tripping of either or both the circuit-breakers B² and B³ as may be required.

As with the arrangement described in Figure 1, the relay G⁴ also has a contact G⁷ controlling a phase-fault indicator J⁵ having two coils connected to the low-current-setting contacts of the relays of the tripping relay device D¹³ in such a manner that the appropriate indicator is operated in the event of a fault which causes operation of the relay G⁴. If desired the phase-fault indicators may be controlled by the time-lag trip relay and the relays of the stabilizing relay devices instead of by the time-lag relay and the relays of the tripping relay devices since, in the event of a fault in the protected section, the stabilizing relay devices at both ends operate.

It will be apparent from the above description that on the occurrence of a fault tripping is effected independently of the high frequency apparatus and thus as a failure of this apparatus prevents the transmission or the reception of a stabilizing current such failure is only likely to cause the cutting out of a sound section in the event of a straight-through fault. In order however to avoid such inadvertent tripping the high frequency apparatus is provided with an alarm bell P⁴ or other suitable indicating or alarm apparatus which will give warning in the event of a fault developing in the high frequency transmitter or receiver.

In the arrangement shown in Figure 1 the current transformers at each end from which the adjacent tripping and stabilizing relay devices are energized, are shown disposed on the same side of the circuit-breaker as the protected portion of the main circuit whilst in the arrangement shown in Figure 2 these current transformers are disposed on the side of the circuit-breaker remote from the protected portion. Whilst the portion actually isolated by the opening of the circuit-breakers at the two ends terminates at the moving contacts of the circuit-breakers, the current transformers—the positions of which determine the area of response of the protective gear controlled thereby (i. e. the part of the main circuit within which a fault will cause operation of the protective gear)—cannot in practice be disposed on the moving contacts of the circuit-breaker and thus the area of response does not usually correspond exactly with the portion of the main circuit which is cut out.

Thus the areas of response of protective gears on adjacent sections may, as in the arrangement of Figure 2, overlap one another or may, as in the arrangement of Figure 1, leave the junction apparatus unprotected, a simple form of back-up protection usually being provided to deal with any faults which may occur in such apparatus.

It is to be understood that where reference is made herein to the protection of a section independently of other sections, this does not exclude overlapping of the areas of response of the protective gears but is intended to signify that the operation of the protective gear of the section is not dependent on the operation of the protective gears on other sections.

In the known arrangements of the kind described in the specifications of United States of American Patents Nos. 1,765,887 and 1,919,092 referred to above, the protective gear is normally in a condition set for tripping, that is to say, on the operation of the tripping relay devices the protected section is cut out unless a directional stabilizing relay device at one end operates within a predetermined time to cause the transmission of a stabilizing current between the ends. The occurrence of a fault in a section of the protected system, however, usually causes a fault current to flow also in a number of sound sections any one of which may be inadvertently cut out in the event of sluggishness or failure of a relay controlling the transmission of a stabilizing current.

This will not occur with the arrangement according to the present invention since the stabilizing relay devices are only required to operate for the purpose of preventing the transmission of a stabilizing current and sluggishness or failure of these relay devices will not interfere with stabilization.

The arrangement according to the invention also has the advantage that there is no delay in stabilization due to the inherent time delay of the directional relays employed for the stabilizing relay devices and thus it is possible to reduce the time lag of the trip relays to a value less than is required in a system in which stabilization is only effected following the operation of one of the directional stabilizing relay devices.

Whilst in the arrangements described two current-setting relays are employed in the tripping relay devices, it is to be understood that relays which operate all their contacts at the same value of operating current may be employed if desired. The two current-setting relays arranged so that their high-current-setting contacts control the adjacent tripping circuit and their low-current-setting contacts the transmission of the stabilizing current, have, however, the advantage that they act as an additional means for ensuring stability under all conditions of straight-through fault current in the manner described in the specification of United States of America Patent No. 1,919,092. Thus the two current-setting relays of the tripping relay devices prevent inadvertent cutting out of a protected section should the tripping relays at the two ends of the section fail to operate exactly simultaneously when a straight-through fault current flows in the section.

It will be appreciated that, although the arrangement according to the invention is normally ready for stabilization, it still relies for its stability on the actual transmission of a stabilizing current between the ends of the section. Thus in the event of a fault in the pilot wires or, in the case of the superimposed high frequency arrangement, the breaking of the power conductors, the stabilizing current is not transmitted and the section is cut out.

It is to be understood that the above description is by way of example only and that modifications may be made within the scope of the invention.

What I claim as my invention and desire to secure by Letters Patent is:—

1. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker and responsive to the power current flowing at the adjacent end of the section, a stabilizing relay device at each end of the section responsive to the direction of power current flow at the adjacent end, normally closed contacts on each stabilizing relay device, means at each end controlled by the adjacent tripping relay device and the normally closed contacts of the adjacent stabilizing relay device whereby on the operation of a tripping relay device at one end a stabilizing current signal is transmitted to the remote end unless such transmission is prevented by the opening of the normally closed contacts of the adjacent stabilizing relay device, and means at each end operated by a stabilizing current signal received from the remote end to prevent tripping of the circuit-breaker at the adjacent end.

2. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker and operative on the occurrence of a fault on the circuit irrespective of the direction of power current flow at the adjacent end of the section, normally open contacts on each tripping relay, a stabilizing relay device at each end of the section operative on the occurrence of a fault on the circuit only when the fault current is flowing into the protected section at the adjacent end, normally closed contacts on each stabilizing relay device, means at each end controlled by the normally open contacts of the adjacent tripping relay device and the normally closed contacts of the adjacent stabilizing relay device for transmitting a stabilizing current signal to the remote end whereby such signal is transmitted when the tripping relay device operates to close its contacts provided that the stabilizing relay device does not operate to open its contacts due to a fault current flowing into the section at the adjacent end, and means at each end operated by a stabilizing current signal received from the remote end to prevent tripping of the circuit-breaker at the adjacent end.

3. An electric protective arrangement for a section of a sectionalized electric power circuit comprising a circuit-breaker at each end of the protected section, a trip circuit for each circuit-breaker, a tripping relay device at each end of the section, each tripping relay device comprising at least one relay operative on the occurrence of a fault on the circuit irrespective of the direction of power current flow at the adjacent end of the section, two contacts on such relay and means whereby a lower current setting is obtained for the operation of one contact than for the operation of the other contact, means whereby the high-current-setting contact of each relay of the tripping relay device controls the trip circuit of the adjacent circuit-breaker, a stabilizing relay device at each end of the section operative on the occurrence of a fault on the circuit only when the fault current is flowing into the section at the adjacent end, normally closed contacts on each stabilizing relay device, means at each end controlled by the low-current-setting contacts of the adjacent tripping relay device and the normally closed contacts of the adjacent stabilizing relay device whereby on the operation of a relay of a tripping relay device at one end to actuate its low-current-setting contact a stabilizing current signal is transmitted to the remote end unless such transmission is prevented by the opening of the normally closed contacts of the adjacent stabilizing relay device, and means at each end operated by a stabilizing current signal received from the remote end to prevent tripping of the circuit-breaker at the adjacent end.

4. The combination with the electric protective arrangement as claimed in claim 3 of an additional normally open contact on at least one relay of each tripping relay device operative at the lower current setting and controlling the energization of the adjacent stabilizing relay device whereby this device can only operate when a relay of the adjacent tripping relay device has operated to close its low-current-setting contacts.

5. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker and responsive to the power current flowing at the adjacent end of the section, a stabilizing relay device at each end of the section responsive to the direction of power current flow at the adjacent end, normally closed contacts on each stabilizing relay device, pilot wires extending between the ends of the section, means at each end controlled by the adjacent tripping relay device and the normally closed contacts of the adjacent stabilizing relay device whereby on the operation of a tripping relay device at one end a stabilizing current is transmitted over the pilot wires to the remote end unless such transmission is prevented by the opening of the normally closed contacts of the adjacent stabilizing relay device, and means at each end operated by the stabilizing current received from the remote end to prevent tripping of the circuit-breaker at the adjacent end.

6. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker, a stabilizing relay device at each end of the section responsive to the direction of power current flow at the adjacent end, normally closed contacts on each stabilizing relay device, pilot wires extending between the ends of the section, means at each end controlled by the adjacent tripping relay device and the normally closed contacts of the adjacent stabilizing relay device whereby on the operation of a tripping relay device at one end a stabilizing current is transmitted over the pilot wires to the remote end unless such transmission is prevented by the opening of the normally closed contacts of the adjacent stabilizing relay device, a lock-out relay at each end acting when operated to prevent tripping of the adjacent circuit-breaker, means controlled by each tripping relay device when it operates for connecting the adjacent lock-out relay to the pilot wires whereby a stabilizing current transmitted over the pilot wires from either end causes the operation of both lock-out relays and thereby prevents tripping of the circuit-breakers at both ends.

7. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker and responsive to the power current flowing at the adjacent end of the section, a stabilizing relay device at each end of the section responsive to the direction of power current flow at the adjacent end, normally closed contacts on each stabilizing relay device, a transmitter and a receiver of high frequency current at each end of the section, each receiver being tuned to the frequency of the transmitter at the remote end, means for coupling each transmitter and receiver to the power circuit at the adjacent end, means at each end controlled by the adjacent tripping relay device and the normally closed contacts of the adjacent stabilizing relay device whereby on the operation of a tripping relay device at one end the adjacent transmitter is set into operation to transmit a high frequency stabilizing current signal over the power circuit to the receiver at the remote end unless prevented by the opening of the normally closed contacts of the adjacent stabilizing relay device, and means whereby the operation of a receiver by a stabilizing current signal received from the remote end prevents tripping of the adjacent circuit-breaker.

8. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker and operative on the occurrence of a fault on the circuit irrespective of the direction of power current flow at the adjacent end of the section, normally open contacts on each tripping relay, a stabilizing relay device at each end of the section operative on the occurrence of a fault on the circuit only when the fault current is flowing into the protected section at the adjacent end, normally closed contacts on each stabilizing relay device, a transmitter and a receiver of high frequency current at each end of the section, each receiver being tuned to the frequency of the transmitter at the remote end, means for coupling each transmitter and receiver to the power circuit at the adjacent end, an auxiliary relay at each end of a section controlled jointly by the normally open contacts of the adjacent tripping relay device and by the normally closed contacts of the adjacent stabilizing relay device whereby such auxiliary relay is operated when the tripping relay device operates to close its contacts provided that the stabilizing relay device does not operate to open its contacts, contacts on each auxiliary relay acting when the relay operates to initiate the operation of the adjacent transmitter to transmit a stabilizing current signal to the remote end and to prevent tripping of the adjacent circuit-breaker, and means whereby the operation of a receiver by a stabilizing current signal received from the remote end prevents tripping of the adjacent circuit-breaker.

9. An electric protective arrangement for a section of a sectionalized electric power circuit comprising a circuit-breaker at each end of the protected section, a trip circuit for each circuit-breaker, a tripping relay device at each end of the section controlling the trip circuit of the adjacent circuit-breaker and operative on the occurrence of a fault on the circuit irrespective of the direction of power current flow at the adjacent end of the section, normally open contacts on each tripping relay, a stabilizing relay device at each end of the section operative on the occurrence of a fault on the circuit only when the fault current is flowing into the protected section at the adjacent end, normally closed contacts on each stabilizing relay device, a transmitter and a receiver of high frequency current at each end of the section, each receiver being tuned to the frequency of the transmitter at the remote end, means for coupling each transmitter and receiver to the power circuit at the adjacent end, an auxiliary relay at each end of the section controlled jointly by the normally open contacts of the adjacent tripping relay device and by the normally closed contacts of the adjacent stabilizing relay device whereby such auxiliary relay is operated when the tripping relay device operates to close its contacts provided that the stabilizing relay device does not operate to open its contacts, contacts on each auxiliary relay acting when the relay operates to initiate the operation of the adjacent transmitter to transmit a stabilizing current signal to the remote end and to prevent tripping of the adjacent circuit-breaker, and a lock-out relay at each end acting when operated to prevent tripping of the adjacent circuit-breaker and controlled by the adjacent high frequency receiver so that the said relay operates when a stabilizing current signal is received from the remote end.

10. The combination with a sectionalized electric power circuit, of circuit-breakers for isolating the sections of the power circuit from one another, a trip circuit for each circuit-breaker and means for protecting each section independently of the other sections comprising a tripping relay device at each end of the section, each tripping relay device comprising at least one relay operative when a fault current is flowing in the circuit at the adjacent end irrespective of the direction of flow of such current, two normally open contacts on such relay and means whereby a lower current-setting is obtained for the operation of one contact than for the operation of the other contact, a stabilizing relay device at each end of the section operative when a fault current is flowing into the section at the adjacent end, normally closed contacts on each stabilizing relay device, pilot wires extending between the ends of the section, a source of electric power at each end of the section, means at each end controlled by the low-current-setting contacts of the adjacent tripping relay device and the normally closed contacts of the adjacent stabilizing relay device whereby the operation of a relay of the tripping relay device to close its low-current-setting contact connects the source of power to the adjacent end of the pilot wires provided that the adjacent stabilizing relay does not operate, a lock-out relay at each end of the section, means whereby the operation of a relay of the tripping relay device to close its high-current-setting contact causes the adjacent lock-out relay to be connected to the pilot wires so that it is operated when a source of power is connected to the pilot wires at either end, and contacts on each lock-out relay acting jointly with the high-current-setting contact of a relay of the adjacent tripping relay device to control the trip circuit of the adjacent circuit-breaker whereby the operation of a relay of the tripping relay device to close its high-current-setting contact causes tripping of the circuit-breaker unless the lock-out relay has operated.

11. The combination with the electric protective arrangement claimed in claim 10 of an additional normally open contact on at least one relay of each tripping relay device operative at the lower current setting and controlling the energization of the adjacent stabilizing relay device whereby this device can only operate when a relay of the adjacent tripping relay device has operated to close its low-current-setting contact.

12. The combination with a sectionalized electric power circuit, of circuit-breakers for isolating the sections of the power circuit from one another, a trip circuit for each circuit-breaker and means for protecting each section independently of the other sections comprising a tripping relay device at each end of the section, each tripping relay device comprising at least one relay operative when a fault current is flowing in the circuit at the adjacent end irrespective of the direction of flow of such current, two normally open contacts on such relay and means whereby a lower current setting is obtained for the operation of one contact than for the operation of the other contact, a stabilizing relay device at each end of the section operative when a fault current is flowing into the section at the adjacent end, normally closed contacts on each stabilizing relay device, means whereby the high-current-setting contact of each relay of the tripping relay device controls the trip circuit of the adjacent circuit-breaker, a transmitter and a receiver of high frequency current at each end of the section, each receiver being tuned to the frequency of the transmitter at the remote end, means for coupling each transmitter and receiver to the power circuit at the adjacent end, means at each end controlled by the low-current-setting contacts of the adjacent tripping relay device and the normally closed contacts of the adjacent stabilizing relay device whereby on the operation of a relay of the tripping relay device to close its low-current-setting contact the adjacent transmitter is set into operation to transmit a high frequency stabilizing current over the power circuit to the remote end provided that the adjacent stabilizing relay device has not operated to open its normally closed contacts, and means whereby the operation of a receiver by a stabilizing current signal received from the remote end prevents tripping of the adjacent circuit-breaker.

13. An electric protective arrangement for a section of a sectionalized electric power circuit comprising a circuit-breaker at each end of the protected section, a trip circuit for each circuit-breaker, a tripping relay device at each end of the section, each tripping relay device comprising at least one relay operative when a fault current is flowing in the circuit at the adjacent end irrespective of the direction of flow of such current, two normally open contacts on such relay and means whereby a lower current setting is obtained for the operation of one contact than for the operation of the other contact, a stabilizing relay device at each end of the section operative when a fault current is flowing into the section at the adjacent end, normally closed contacts on each stabilizing relay device, a transmitter and a receiver of high frequency current at each end of the section, each receiver being tuned to the frequency of the transmitter at the remote end, means for coupling each transmitter and receiver to the power circuit at the adjacent end, an auxiliary relay at each end of the section controlled jointly by the low-current-setting contact of a relay of the adjacent tripping relay device and the normally closed contacts of the adjacent stabilizing relay device whereby such auxiliary relay is operated when the relay of the tripping relay device operates to close its low-current-setting contact provided that the stabilizing relay device does not operate, contacts on each auxiliary relay acting when the relay operates to initiate the operation of the adjacent transmitter to transmit a high frequency stabilizing current signal to the remote end and to prevent tripping of the adjacent circuit-breaker, a lock-out relay at each end controlled by the adjacent receiver in such a manner that the lock-out relay is operated when a stabilizing current signal is received from the remote end, contacts on each lock-out relay acting when the relay operates to prevent tripping of the adjacent circuit-breaker, and means whereby the operation of a relay of a tripping relay device to close its high-current-setting contact effects tripping of the adjacent circuit-breaker unless the adjacent auxiliary relay or lock-out relay has operated.

14. The combination with a sectionalized electric power circuit, of circuit-breakers for isolating the sections of the power circuit from one another, a trip circuit for each circuit-breaker and means for protecting each section independently of the other sections comprising a tripping relay device at each end of the section controlling the trip circuit of the adjacent circuit-breaker, each tripping relay device comprising a group of relays which are responsive both to earth faults and to interphase faults on the circuit irrespective of the direction of power current flow at the adjacent end of the section, a stabilizing relay device at each end of the section, each stabilizing relay device comprising a group of directional relays which are responsive both to earth faults and to interphase faults when the fault current is flowing into the protected section at the adjacent end, normally closed contacts on each relay of the stabilizing relay device, means at each end controlled by the adjacent tripping relay device and the normally closed contacts of the adjacent stabilizing relay device whereby on the operation of a relay of the tripping relay device at one end a stabilizing current signal is transmitted to the remote end unless such transmission is prevented by the opening of the contacts of the corresponding relay of the adjacent stabilizing relay device and means at each end operated by a stabilizing current signal received from the remote end to prevent tripping of the circuit-breaker at the adjacent end.

15. The combination with a sectionalized electric power circuit, of circuit-breakers for isolating the sections of the power circuit from one another, a trip circuit for each circuit-breaker and means for protecting each section independently of the other sections comprising a tripping relay device at each end of the section responsive to the power current flowing at the adjacent end of the section, each tripping relay device comprising a group of relays at least one of which is responsive to interphase faults and another to earth faults, a stabilizing relay device at each end of the section, each stabilizing relay device comprising a group of directional relays at least one of which is responsive to interphase faults and another to earth faults provided that the fault current is flowing into the protected section at the adjacent end, normally closed contacts on each relay of the stabilizing relay device, means at each end controlled by each relay of the adjacent tripping relay device and the corresponding relay of the adjacent stabilizing relay device whereby on the operation of a relay of the tripping relay device at one end a stabilizing current signal is transmitted to the remote end unless such transmission is prevented by the opening of the contacts of the corresponding relay of the adjacent stabilizing relay device, means at each end operated by a stabilizing current signal received from the remote end to prevent tripping of the circuit-breaker at the adjacent end, and a time-lag trip relay at each end controlling the trip circuit of the adjacent circuit-breaker and controlled by the adjacent tripping relay device.

16. An electric protective arrangement for a sectionalized electric power circuit comprising a circuit-breaker at each end of the protected section, a trip circuit for each circuit-breaker, a time-lag trip relay at each end controlling the adjacent trip circuit, an energizing circuit for each time-lag trip relay, a tripping relay device at each end of the section, each tripping relay device comprising a group of relays which are responsive both to earth faults and interphase faults irrespective of the direction of flow of the fault current at the adjacent end of the section, each of such relays having two contacts and means whereby a lower current setting is obtained for the operation of one contact than for the operation of the other contact, a stabilizing relay device at each end, each stabilizing relay device comprising a group of directional relays which are responsive both to earth faults and to interphase faults when the fault current is flowing into the protected section at the adjacent end, normally closed contacts on each relay of the stabilizing relay device, an auxiliary tripping relay controlled by the high-current-setting contact of each relay of the adjacent tripping relay device, normally open contacts on each auxiliary tripping relay connected in series in the energizing circuit of the adjacent time-lag trip relay, an auxiliary stabilizing relay controlled jointly by the low-current-setting contact of each relay of the adjacent tripping relay device and the normally closed contacts of the corresponding relay of the adjacent stabilizing relay device whereby such auxiliary stabilizing relay is operated when a relay of the tripping relay device operates to close its low-current-setting contact provided that the corresponding relay of the stabilizing relay device does not operate, pilot wires extending between the ends of the section, a source of electric power at each end of the section, contacts on each auxiliary stabilizing relay acting when the relay operates to connect the adjacent source of power to the pilot wires, a lock-out relay at each end controlled by the adjacent auxiliary tripping relay so that it is connected to the pilot wires on the operation of the said relay, and normally closed contacts on each lock-out relay connected in series in the energizing circuit of the adjacent time-lag trip relay.

17. The combination with a sectionalized electric power circuit, of circuit-breakers for isolating the sections of the power circuit from one another, a trip circuit for each circuit-breaker and means for protecting each section independently of the other sections comprising a tripping relay device at each end of the section controlling the trip circuit of the adjacent circuit-breaker, each tripping relay device comprising a group of relays which are responsive both to earth faults and to interphase faults, a stabilizing relay device at each end of the section, each stabilizing relay device comprising a group of directional relays which are responsive both to earth faults and to interphase faults when the fault current is flowing into the protected section at the adjacent end, normally closed contacts on each relay of the stabilizing relay device, a transmitter and a receiver of high frequency current at each end of the section, each receiver being tuned to the frequency of the transmitter at the remote end, means for coupling each transmitter and receiver to the power circuit at the adjacent end, means at each end controlled by each relay of the adjacent tripping relay device and the corresponding relay of the adjacent stabilizing relay device whereby on the operation of a relay of a tripping relay device at one end the adjacent transmitter is set into operation to transmit a high frequency stabilizing current signal over the power circuit to the remote end provided that the corresponding relay of the adjacent stabilizing relay device does not operate to open its normally closed contacts, and means whereby the operation of a receiver by a stabilizing current signal received from the remote end prevents tripping of the adjacent circuit-breaker.

18. The combination with a sectionalized electric power circuit, of circuit-breakers for isolating the sections of the power circuit from one another, a trip circuit for each circuit-breaker, pilot wires extending between the ends of each section and normally connected up for purposes other than protective purposes, and means for protecting each section independently of the other sections comprising a tripping relay device at each end of the section controlling the trip circuit of the adjacent circuit-breaker and responsive to the power current flowing at the adjacent end of the section, a stabilizing relay device at each end of the section responsive to the direction of power current flow at the adjacent end, normally closed contacts on each stabilizing relay device, means at each end controlled by the adjacent tripping relay device and the normally closed contacts of the adjacent stabilizing relay device whereby the operation of a tripping relay device disconnects the adjacent ends of the pilot wires from their normal connections, means whereby on the operation of a tripping relay device at one end a stabilizing current is transmitted over the pilot wires to the remote end unless such transmission is prevented by the opening of the normally closed contacts of the adjacent stabilizing relay device, and means at each end operated by the stabilizing current received from the remote end to prevent tripping of the circuit-breaker at the adjacent end.

19. The combination with a sectionalized electric power circuit, of circuit-breakers for isolating the sections of the power circuit from one another, a trip circuit for each circuit-breaker, pilot wires extending between the ends of each section and normally connected up for purposes other than protective purposes, and means for protecting each section independently of the other sections comprising a tripping relay device at each end of the section controlling the trip circuit of the adjacent circuit-breaker, a stabilizing relay device at each end of the section responsive to the direction of power current flow at the adjacent end, normally closed contacts on each stabilizing relay device, a lock-out relay at each end acting when operated to prevent tripping of the adjacent circuit-breaker, means controlled by each tripping relay device when it operates for disconnecting the adjacent ends of the pilot wires from their normal connections and connecting the adjacent lock-out relay thereto, and means at each end controlled by the adjacent tripping relay device and the normally closed contacts of the adjacent stabilizing relay device whereby on the operation of a tripping relay device at one end a stabilizing current is transmitted over the pilot wires to the remote end unless such transmission is prevented by the opening of the normally closed contacts of the adjacent stabilizing relay device, such stabilizing current causing the operation of both lock-out relays and thereby preventing tripping of the circuit-breakers at both ends.

20. The combination with a sectionalized electric power circuit, of circuit-breakers for isolating the sections of the power circuit from one another, a trip circuit for each circuit-breaker and means for protecting each section independently of the other sections comprising a tripping relay device at each end of the section controlling the trip circuit of the adjacent circuit-breaker and responsive to the power current flowing at the adjacent end of the section, a stabilizing relay device at each end of the section operative on the occurrence of a fault in the circuit only when the fault current is flowing into the protected section at the adjacent end, normally closed contacts on each stabilizing relay device, a transmitter and a receiver of high frequency current at each end of the section, each receiver being tuned to the frequency of the transmitter at the remote end, means for coupling each transmitter and receiver to the power circuit at the adjacent end, means for initiating the operation of each transmitter controlled jointly by the adjacent tripping relay device and the normally closed contacts on the adjacent stabilizing relay device whereby a high frequency stabilizing current is transmitted to the remote end when a tripping relay device operates provided that the adjacent stabilizing relay device does not operate to open its normally closed contacts, and means whereby the operation of a receiver by a stabilizing current signal received from the remote end prevents tripping of the adjacent circuit-breaker.

HENRY LEYBURN.